US012398586B2

(12) United States Patent
Li et al.

(10) Patent No.: US 12,398,586 B2
(45) Date of Patent: Aug. 26, 2025

(54) LOAD-BEARING ACCESSORY, AND WINDOW

(71) Applicant: SHENZHEN HOPO WINDOW CONTROL TECHNOLOGY CO., LTD, Shenzhen (CN)

(72) Inventors: Shupeng Li, Shenzhen (CN); Qingliang Zhou, Shenzhen (CN)

(73) Assignee: SHENZHEN HOPO WINDOW CONTROL TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/576,247

(22) PCT Filed: Feb. 27, 2023

(86) PCT No.: PCT/CN2023/078456
§ 371 (c)(1),
(2) Date: Jan. 3, 2024

(87) PCT Pub. No.: WO2023/169241
PCT Pub. Date: Sep. 14, 2023

(65) Prior Publication Data

US 2024/0240502 A1 Jul. 18, 2024

(30) Foreign Application Priority Data

Mar. 9, 2022 (CN) ......................... 202210224162.8

(51) Int. Cl.
*E05D 7/04* (2006.01)
*E05D 3/02* (2006.01)

(52) U.S. Cl.
CPC ................ *E05D 7/04* (2013.01); *E05D 3/02* (2013.01); *E05D 2007/0469* (2013.01)

(58) Field of Classification Search
CPC ....... E05D 7/04; E05D 7/0009; E05D 7/0027; E05D 2007/0469; E05D 2007/0036; E05F 7/06
See application file for complete search history.

(56) References Cited

U.S. PATENT DOCUMENTS 5,400,474 A * 3/1995 Yulkowski .............. E05F 7/005 16/259
5,694,665 A * 12/1997 Strickland ............. E05D 7/0423 16/237
2003/0070768 A1 4/2003 Lewis, Jr. et al.

FOREIGN PATENT DOCUMENTS

CN 1590196 A 3/2005
CN 110778234 A 2/2020
(Continued)

OTHER PUBLICATIONS

International Search Report; China National Intellectual Property Administration (ISA/CN); International Application No. PCT/CN2023/078456; Jun. 13, 2023; 4 pages.
(Continued)

*Primary Examiner* — Marcus Menezes
(74) *Attorney, Agent, or Firm* — Taft Stettinius & Hollister LLP

(57) ABSTRACT

A load-bearing accessory includes a hinge, a frame and a connector. The frame includes an adjustment portion and a support portion. The distance between the adjustment portion and the support portion is adjustable. A first end of the connector is connected to the hinge, and a second end of the connector is connected to the adjustment portion. One of the hinge or the frame that is located at the upper position of the load-bearing accessory is configured to support the connector, and the connector is configured to support the other one
(Continued)

of the hinge or the frame that is located at the lower position of the load-bearing accessory.

16 Claims, 9 Drawing Sheets

(56) References Cited

FOREIGN PATENT DOCUMENTS

| | | | | | |
|---|---|---|---|---|---|
| CN | 210122864 | U | | 3/2020 | |
| CN | 211081406 | U | | 7/2020 | |
| CN | 215292013 | U | | 12/2021 | |
| CN | 114592762 | A | | 6/2022 | |
| CN | 217028506 | U | | 7/2022 | |
| EP | 0385414 | B1 | | 9/1992 | |
| EP | 851085 | A1 | * | 7/1998 | E05D 15/5211 |
| EP | 1489255 | A1 | | 12/2004 | |
| EP | 1837472 | A1 | | 9/2007 | |
| EP | 2159360 | A2 | * | 3/2010 | E05D 15/526 |
| EP | 3919710 | A1 | | 12/2021 | |

OTHER PUBLICATIONS

Written Opinion of the International Searching Authority; China National Intellectual Property Administration (ISA/CN); International Application No. PCT/CN2023/078456; Jun. 13, 2023; 5 pages.

Chinese Office Action; Chinese Patent Application No. 2023070600017840; Jul. 6, 2023; 14 pages.

Extended European Search Report; European Patent Office; European Patent Application No. 23765819.0; Apr. 14, 2025; 9 pages.

* cited by examiner

LOAD-BEARING ACCESSORY, AND WINDOW

CROSS REFERENCE TO RELATED APPLICATIONS

This application is a U.S. national stage filing, filed under 35 U.S.C. 371, of International Patent Application No. PCT/CN2023/078456 filed on Feb. 27, 2023, which claims priority to Chinese Patent Application No. 202210224162.8 filed with the China National Intellectual Property Administration (CNIPA) on Mar. 9, 2022, the disclosures of which is are incorporated herein by reference in their entirety.

TECHNICAL FIELD

The present application relates to the technical field of doors and windows, for example, a load-bearing accessory and a window.

BACKGROUND

A door and window sash member is generally connected to a frame body through an open hinge or a hidden hinge. For structures connected through an open hinge, when a door and window sash is relatively heavy, only the number of hinges needs to be increased. For structures connected through a hidden hinge, due to the inherent structure of the hidden hinge, a door and window is usually provided with only a pair of hidden hinges. This limits the load-bearing capacity of the pair of hidden hinges and makes it difficult to achieve the load-bearing capacity of the open hinge.

The load-bearing force of a hinge is shared through some additional load-bearing accessories. A load-bearing accessory uses a rigid shaft to connect a frame body and a sash member. The rigid shaft is relatively long, making the entire load-bearing accessory relatively long and relatively expensive, and a pure hinge structure can only be applied to a casement window and cannot be applied to a tilt and turn window.

SUMMARY

The present application provides a load-bearing accessory and a window to solve the technical problems of high cost and inability to be applied to a tilt and turn window in the related art. A load-bearing accessory is provided and includes a hinge, a frame including an adjustment portion and a support portion, where a distance between the adjustment portion and the support portion is adjustable; and a connector, where a first end of the connector is connected to the hinge, a second end of the connector is connected to the adjustment portion, one of the hinge or the frame that is located at an upper position of the load-bearing accessory is configured to support the connector, and the connector is configured to support another one of the hinge or the frame that is located at a lower position of the load-bearing accessory.

The frame includes an adjustment screw; a first threaded hole penetrating one of the adjustment portion or the support portion in an up-down direction is disposed inside the one of the adjustment portion or the support portion, the adjustment screw is threadedly connected to the first threaded hole and has an end portion abutting onto another one of the adjustment portion or the support portion, a first through hole is disposed inside the support portion, and the connector passes through the first through hole.

A second threaded hole is disposed inside the support portion, a periphery of the adjustment portion is provided with an external thread, and the adjustment portion is threadedly connected to the second threaded hole.

The adjustment portion includes an adjustment block and a spring, a stepped hole penetrating the adjustment block in an up-down direction is disposed inside the adjustment block, one end of the connector is located inside the stepped hole, the stepped hole includes a large diameter segment and a small diameter segment, the spring is located inside the large diameter segment, has a first end abutting onto a solid end surface of the small diameter segment in a peripheral direction of the small diameter segment and is sleeved outside the connector, and an end portion of the connector abuts onto a second end of the spring.

The one of the hinge or the frame that is located at the upper position of the load-bearing accessory is mounted on a first component, the another one of the hinge or the frame that is located at the lower position of the load-bearing accessory is mounted on a second component, and the first component is configured to support the second component.

The hinge includes a fixed portion and a connecting portion, the fixed portion is connected to the first component or the second component, the connecting portion includes a connecting block and a fixed shaft, the connecting block is provided with a placement groove, and a first connecting hole along a height direction, upper and lower sides of the placement groove are each provided with at least one first connecting hole, the fixed portion is provided with one second connecting hole along a height direction, the fixed shaft sequentially passes through the at least one first connecting hole on the upper side of the placement groove, the one second connecting hole, and the at least one first connecting hole on the lower side of the placement groove, the placement groove is able to accommodate the fixed portion, the connecting block is provided with a mounting hole penetrating the connecting block in an up-down direction, and the connector is connected to an inside of the mounting hole.

The fixed portion includes a first lock tab, a first fixed block and a first screw, the first lock tab is fixedly connected to one of the first component or the second component, the first fixed block is provided with a second through hole, and the first screw passes through the second through hole and is threadedly connected to the first lock tab.

The fixed portion includes a first fixed block and a first connecting screw, the first fixed block is provided with a first connecting through hole, and the first connecting screw passes through the first connecting through hole and is threadedly connected to one of the first component or the second component.

The support portion includes a second lock tab, a second fixed block and a second screw, the second lock tab is fixedly connected to another one of the first component or the second component, the second fixed block is provided with a third through hole, and the second screw passes through the third through hole and is threadedly connected to the second lock tab.

The support portion includes a second fixed block and a second connecting screw, the second fixed block is provided with a second connecting through hole, and the second connecting screw passes through the second connecting through hole and is threadedly connected to another one of the first component or the second component.

The connector is a flexible member.

A window is provided and includes a fixed window frame, a movable window sash and the preceding load-bearing accessory, where one of a hinge or a frame that is located at an upper position of the load-bearing accessory is connected to the fixed window frame, and another one of the hinge or the frame that is located at a lower position of the load-bearing accessory is connected to the movable window sash.

REFERENCE LIST

Figure 1:
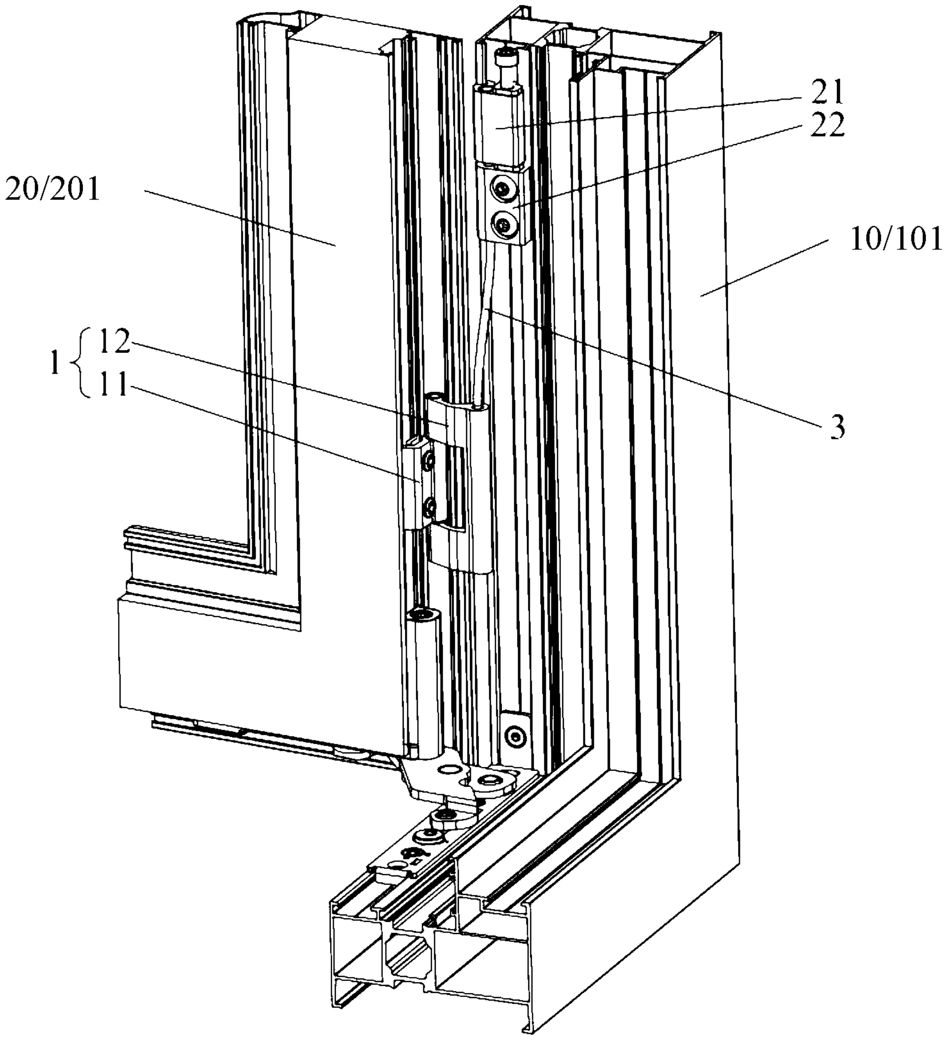
FIG. 1 is a view illustrating the structure of a window according to embodiment one of the present application.

10 first component
101 fixed window frame
20 second component
201 movable window sash
1 hinge
11 fixed portion
111 first lock tab
112 first fixed block
113 first screw
114 second through hole
115 second connecting hole
116 first connecting screw
117 first connecting through hole
12 connecting portion
121 connecting block
1211 first connecting hole
1212 mounting hole
122 fixed shaft
123 placement groove
13 gasket
2 frame
21 adjustment portion
211 adjustment block
212 spring
213 adjustment groove
214 first threaded hole
215 stepped hole
216 external thread
22 support portion
221 second lock tab
222 second fixed block
223 second screw
224 third through hole
225 first through hole
226 second threaded hole
227 second connecting screw
228 second connecting through hole
23 adjustment screw
3 connector

DETAILED DESCRIPTION

Examples of embodiments of the present application are described below in detail with reference to the drawings. The same or similar reference numerals indicate the same or similar elements or elements having the same or similar functions. The embodiments described below with reference to the drawings are exemplary and intended to explain the present application and cannot be construed as limiting the present application.

In the description of the embodiments, terms “joined”, “connected”, and “fixed” are to be understood in a broad sense unless otherwise expressly specified and limited. For example, the term “connected” may refer to “fixedly connected”, “detachably connected”, or “integrated”, may refer to “mechanically connected” or “electrically connected”, or may refer to “connected directly”, “connected indirectly through an intermediary”, or “connected inside two elements” or “an interaction relation between two elements”. For those of ordinary skill in the art, meanings of the preceding terms in the present application may be understood based on situations.

In the present application, unless otherwise specified and limited, when a first feature is described as being “on” or “below” a second feature, the first feature and the second feature may be in direct contact or be in contact via another feature between the two features instead of being in direct contact. Moreover, when the first feature is described as being “on”, “above”, or “over” the second feature, the first feature is right on, above, or over the second feature, the first feature is obliquely on, above, or over the second feature, or the first feature is simply at a higher level than the second feature. When the first feature is described as being “under”, “below”, or “underneath” the second feature, the first feature is right under, below; or underneath the second feature, the first feature is obliquely under, below; or underneath the second feature, or the first feature is simply at a lower level than the second feature.

In embodiments of the present application, a door and window structure or a door and window assembly is a structure or assembly applied to a door and window.

Embodiment One

Figure 2:
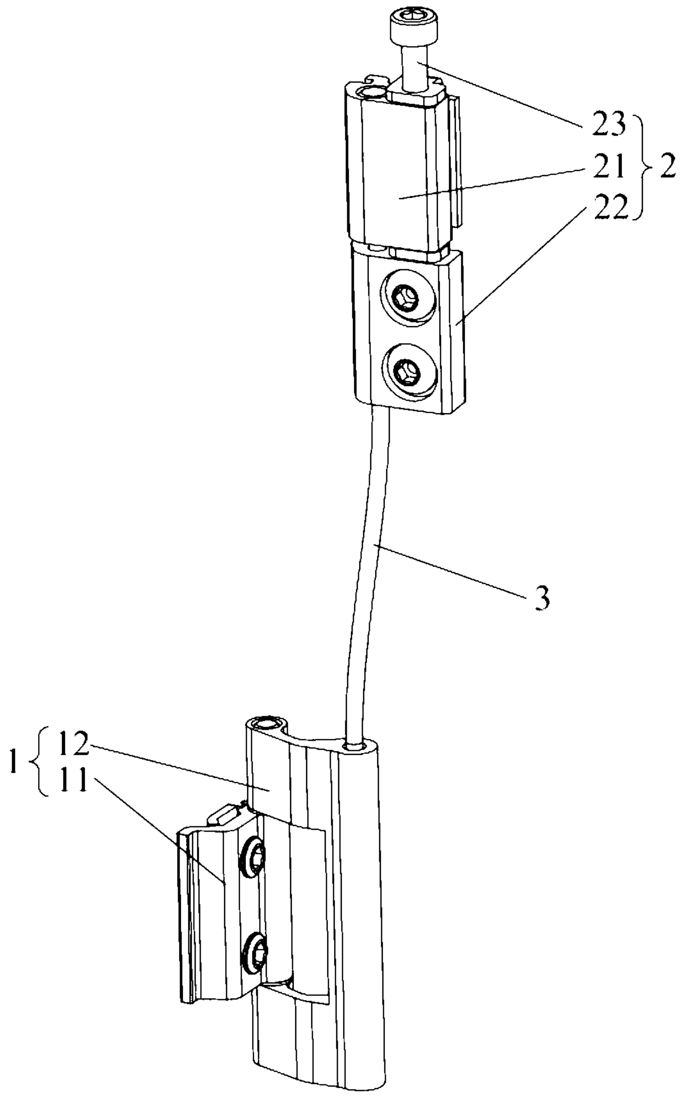
FIG. 2 is a view illustrating the structure of a load-bearing accessory according to embodiment one of the present application.

Referring to FIGS. 1 and 2, an embodiment of the present application provides a load-bearing accessory. The load-bearing accessory includes a hinge 1, a frame 2 and a connector 3. The frame 2 includes an adjustment portion 21 and a support portion 22. The distance between the adjustment portion 21 and the support portion 22 is adjustable. A first end of the connector 3 is connected to the hinge 1, and a second end of the connector 3 is connected to the adjustment portion 21. Located at the upper position of the load-bearing accessory, the frame 2 is configured to support the connector 3, and the connector 3 is configured to support the hinge 1. The frame 2 supports the connector 3 so that the connector 3 can support the hinge 1, and so that the frame 2 can bear the force of the hinge 1. Consequentially, the structure can be simple, and the cost can be low. Since the distance between the adjustment portion 21 and the support portion 22 is adjustable, the distance between the hinge 1 and the frame 2 is changeable, that is, the support may also be maintained when the distance between the hinge 1 and the frame 2 becomes longer.

The connector 3 is resiliently connected to the adjustment portion 21 to cooperate with the distance adjustment between the adjustment portion 21 and the support portion 22 so that the adjustment portion 21 can adjust the magnitude of the force shared by the load-bearing accessory.

Figure 3:
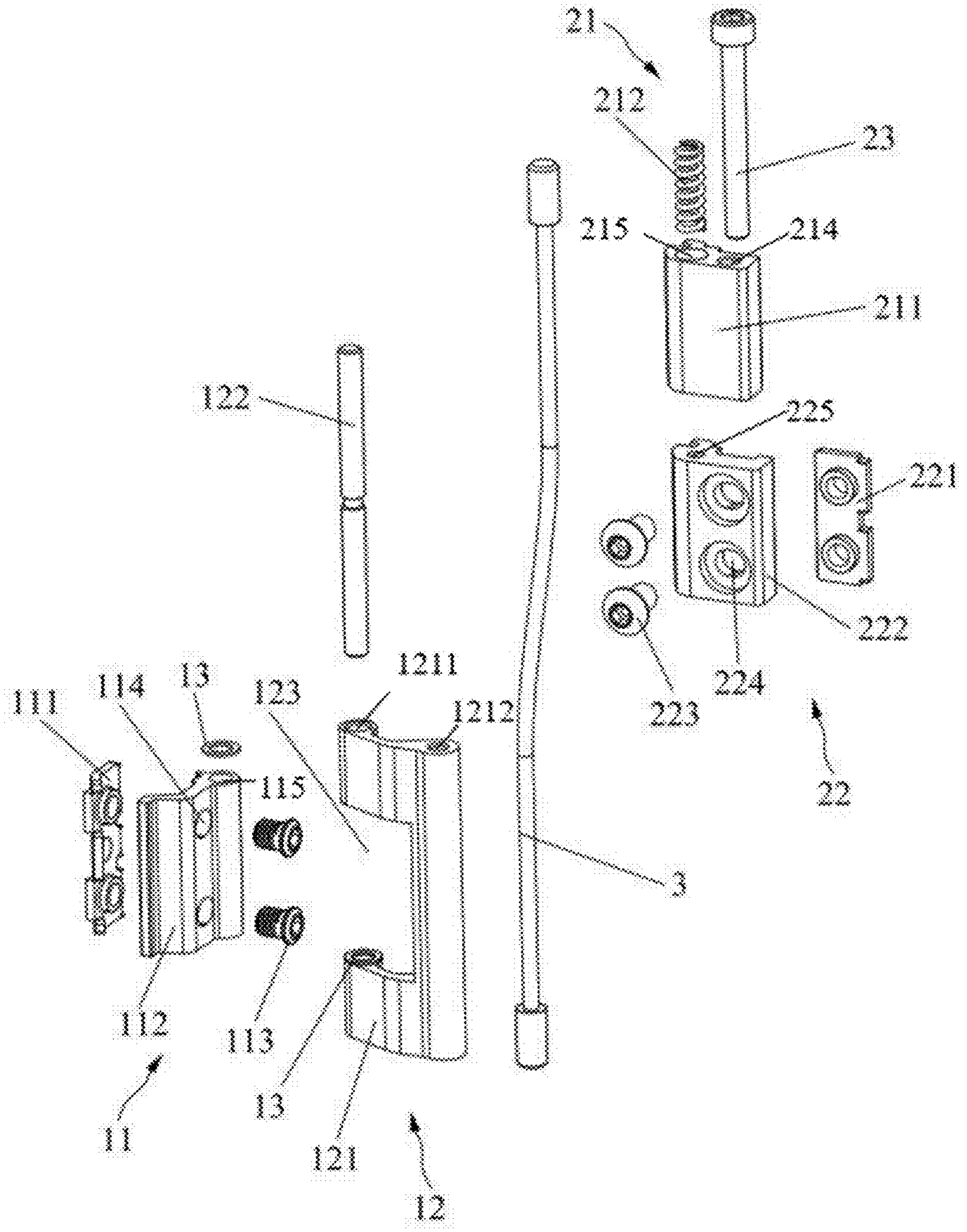
FIG. 3 is an exploded view illustrating the structure of a load-bearing accessory according to embodiment one of the present application.
Figure 4:
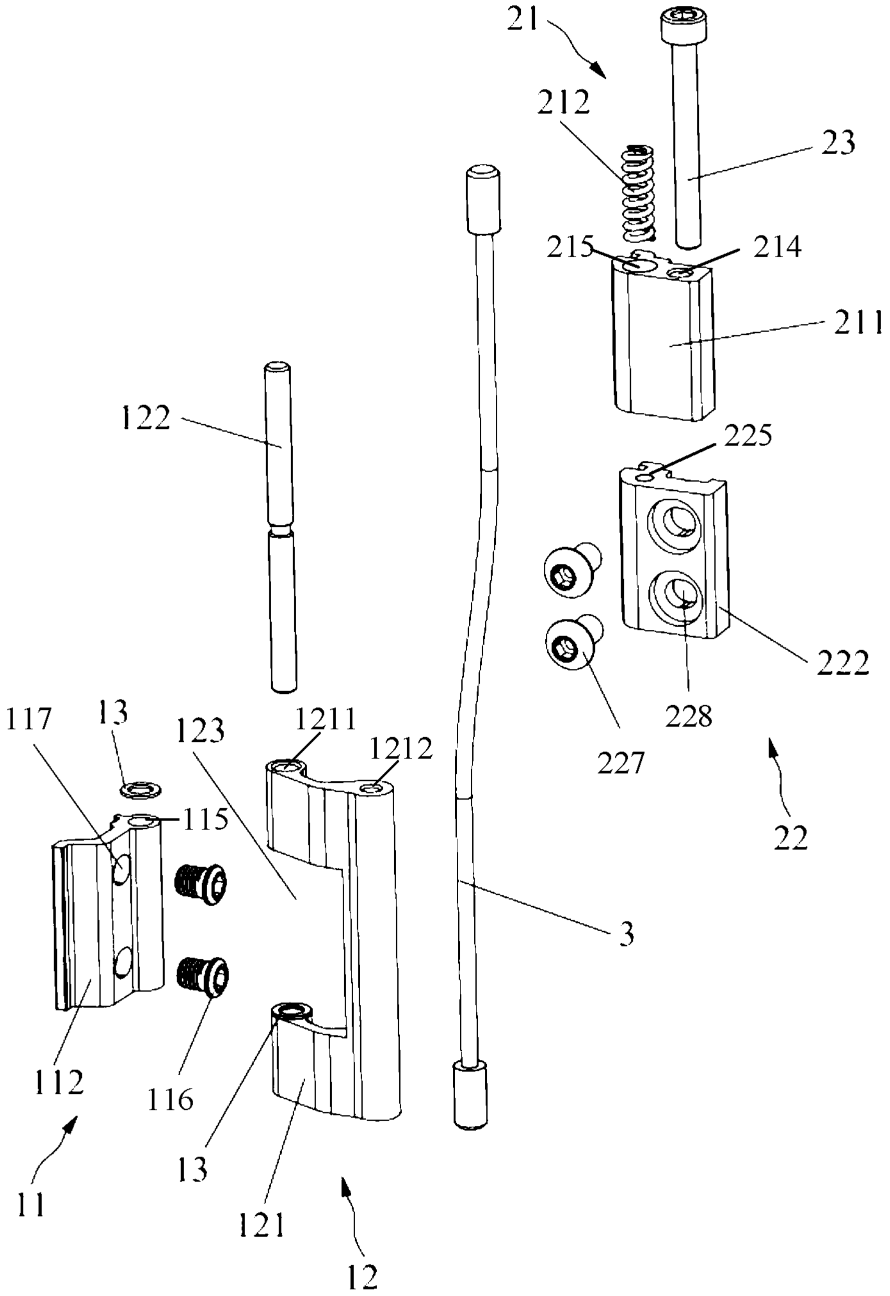
FIG. 4 is an exploded view illustrating the structure of another load-bearing accessory according to embodiment one of the present application.

Referring to FIGS. 2 to 4, the frame 2 includes an adjustment screw 23, a first threaded hole 214 penetrating the adjustment portion 21 in an up-down direction is disposed inside the adjustment portion 21, and the adjustment screw 23 is threadedly connected to the first threaded hole 214 and has an end portion abutting onto the support portion 22 so that the distance between the adjustment portion 21 and the support portion 22 can be adjusted. Moreover, a first through hole 225 is disposed inside the support portion 22, the connector 3 passes through the first through hole 225, and the first through hole 225 limits the position of the connector 3 so that the adjustment portion 21 cannot move with the support portion 22 in a horizontal direction.

The adjustment portion 21 includes an adjustment block 211 and a spring 212. A stepped hole 215 penetrating the adjustment block 211 in an up-down direction is disposed inside the adjustment block 211. One end of the connector 3 is located inside the stepped hole 215. The stepped hole 215 includes a large diameter segment and a small diameter segment. The spring 212 is located inside the large diameter segment, has a first end abutting onto a solid end surface of the small diameter segment in a peripheral direction of the small diameter segment and is sleeved outside the connector 3. An end portion of the connector 3 abuts onto a second end of the spring 212. Consequentially, the connector 3 can be resiliently connected to the adjustment portion 21 so that the adjustment portion 21 can adjust the magnitude of the force shared by the load-bearing accessory; the materials of the spring 212 can be conveniently obtained, and the cost can be low; and the stepped hole 215 can limit the position of the spring 212 so that the spring 212 can be placed inside the adjustment block 211.

The adjustment screw 23 is rotated so that the adjustment block 211 can move away from the support portion 22. The end portion of the connector 3 compresses the spring 212 to tighten the connection between the connector 3 and the adjustment portion 21.

A head of the adjustment screw 23 is provided with an adjustment groove, and the adjustment screw 23 is rotated through a screwdriver adapted to the shape and size of the adjustment groove. In this embodiment, the adjustment groove is in a hexagon shape. Optionally, the adjustment groove may be in other shapes such as a minus or a square.

Referring to FIG. 1, one of the hinge 1 or the frame 2 that is located at the upper position of the load-bearing accessory is mounted on a first component 10, and the other one of the hinge 1 or the frame 2 that is located at the lower position of the load-bearing accessory is mounted on a second component 20, and the first component 10 is configured to support the second component 20. In this embodiment, the first component 10 is a fixed window frame, and the second component 20 is a movable window sash. Optionally, in other embodiments, the first component 10 and the second component 20 may also be other structures. For example, the first component 10 is a door frame, and the second component 20 may be a door body.

Figure 5:
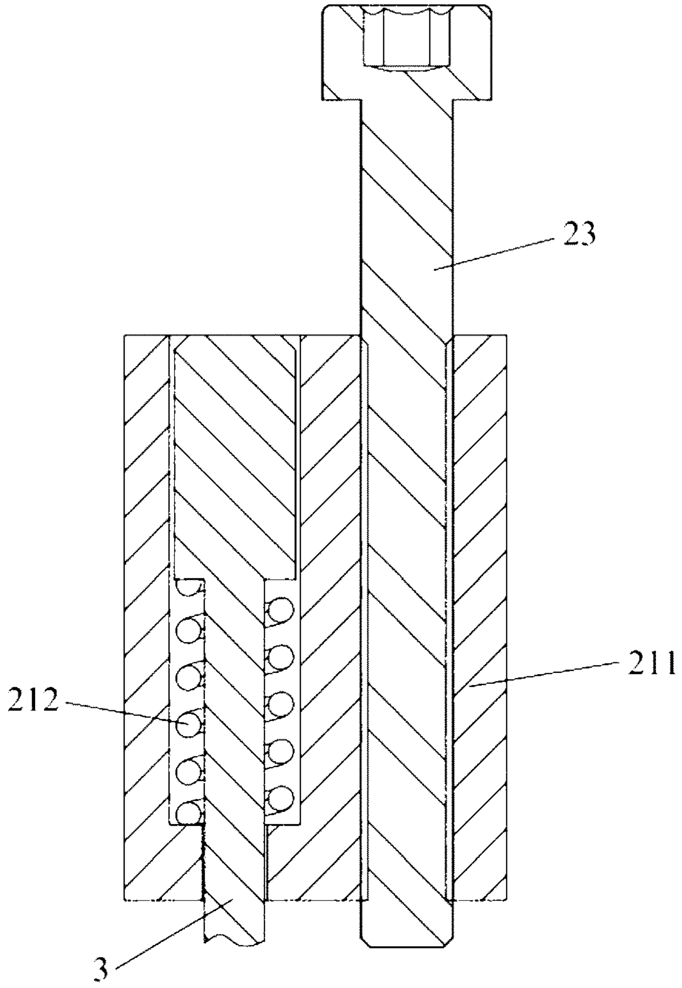
FIG. 5 is section view one illustrating the partial structure of a load-bearing accessory according to embodiment one of the present application.

Referring to FIGS. 3 and 5, the hinge 1 includes a fixed portion 11 and a connecting portion 12. The fixed portion 11 is connected to the second component 20. The connecting portion 12 includes a connecting block 121 and a fixed shaft 122. The connecting block 121 is provided with a placement groove 123, and a first connecting hole 1211 along a height direction. Upper and lower sides of the placement groove 123 are each provided with at least one first connecting hole 1211. The fixed portion 11 is provided with one second connecting hole 115 along a height direction. The fixed shaft 122 sequentially passes through the at least one first connecting hole 1211 on the upper side of the placement groove 123, the second connecting hole 115, and the at least one first connecting hole 1211 on the lower side of the placement groove 123. The placement groove 123 can accommodate the fixed portion 11. The connecting block 121 is provided with a mounting hole 1212 penetrating the connecting block 121 in an up-down direction. The connector 3 is connected inside of the mounting hole 1212. Consequentially, the fixed shaft 122 enables the rotation between the connecting block 121 and the fixed portion 11. In this embodiment, the placement groove 123 is a U-shaped groove, and the mounting hole 1212 is a stepped hole preventing the mounting hole 1212 the connector 3 from disengaging from the connecting block 121. The movable window sash is provided with a sealing strip. The surface of the connecting block 121 facing the sealing strip is curved, preventing wear on the sealing strip when the movable window sash is opened and closed.

Referring to FIGS. 3 and 4, the fixed portion 11 includes a first lock tab 111, a first fixed block 112 and a first screw 113. The first lock tab 111 engages with the second component 20, facilitating disassembly and assembly. The first fixed block 112 is provided with a second through hole 114. The first screw 113 passes through the second through hole 114 and is threadedly connected to the first lock tab 111. Consequentially, the structure can be simple, and convenient to mount, and the hinge 1 can be connected to the second component 20. Two first screws 113 are provided along the height direction of the first lock tab 111. The number of first screws 113 may be selected according to actual situations.

Optionally, the fixed portion 11 includes the first fixed block 112 and a first connecting screw 116. The first fixed block 112 is provided with a first connecting through hole 117. The first connecting screw 116 passes through the first connecting through hole 117 and is threadedly connected to the second component 20. That is, the first fixed block 112 can also be connected to the second component 20 without the first lock tab 111.

The hinge 1 further includes two gaskets 13. The two gaskets 13 are placed inside the placement groove 123 and are located on the upper and lower sides of the first fixed block 112 respectively. The fixed shaft 122 passes through the two gaskets 13 to prevent wear at the rotation junctures between the first fixed block 12 and the connecting block 121.

The support portion 22 includes a second lock tab 221, a second fixed block 222 and a second screw 223. The second lock tab 221 engages with the first component 10. The second fixed block 222 is provided with a third through hole 224. The second screw 223 passes through the third through hole 224 and is threadedly connected to the second lock tab 221. Consequentially, the structure can be simple, and convenient to mount, and the frame 2 can be connected to the first component 10. Two second screws 223 are provided along the height direction of the second lock tab 221. The number of second screws 223 may be selected according to actual situations.

Optionally, the support portion 22 includes the second fixed block 222 and a second connecting screw 227. The second fixed block 222 is provided with a second connecting through hole 228. The second connecting screw 227 passes through the second connecting through hole 228 and is threadedly connected to the first component 10. That is, the second fixed block 222 may also be connected to the first component 10 without the second lock tab 221.

Referring to FIGS. 2 to 5, the connector 3 is a flexible member. The flexible member is not prone to damage when being pulled so that the service life of the connector 3 can be prolonged. The connector 3 includes a body and two heads. The two heads are connected to two ends of the body respectively. The body is a steel cable. The two heads are stainless steel members. The cross sections of the body and the two heads are circular. The diameter of each head is greater than the diameter of the body. The two heads are located inside the stepped hole 215 and the mounting hole 1212 respectively. During assembly, the body first passes through the stepped hole 215 and the mounting hole 1212, the spring 212 is sleeved outside the body, and the two heads are then mounted at the two ends of the body respectively.

An embodiment of the present application provides a window. The window includes a fixed window frame 101, a movable window sash 201 and the load-bearing accessory. The frame 2 is connected to the fixed window frame 101. The hinge 1 is connected to the movable window sash 201.

The fixed window frame 101 can support the movable window sash 201 through the load-bearing accessory. When the tilt and turn window is opened, the distance between the fixed window frame 101 and the movable window sash 201 is changed. Since the distance between the adjustment portion 21 and the support portion 22 is adjustable, the support can also be maintained even when the distance between the hinge 1 and the frame 2 becomes longer. That is, the load-bearing accessory can be applied to both the casement window and the tilt and turn window and thereby have a wide application range. The connector 3 is resiliently connected to the adjustment portion 21 and is a flexible member so that the load-bearing accessory can be easily opened when being applied to the tilt and turn window. The fixed window frame 101 is connected to the movable window sash 201 through a hidden hinge, and the load-bearing accessory shares the load-bearing force of the hidden hinge so that the fixed window frame 101 can bear the movable window sash 201 having a large weight. The service life of the hidden hinge is prolonged so that the hidden hinge cannot be prone to damage.

Embodiment Two

Figure 6:
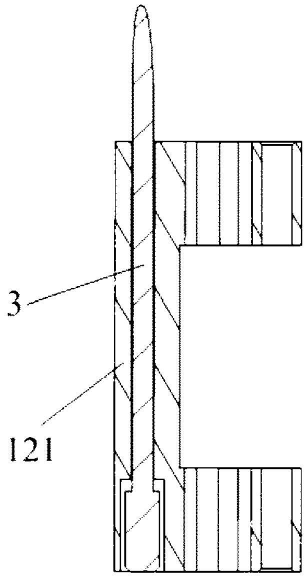
FIG. 6 is section view two illustrating the partial structure of a load-bearing accessory according to embodiment one of the present application.

FIG. 6 shows embodiment two in which the same or corresponding parts as in embodiment one use reference numerals corresponding to embodiment one. For simplicity; only differences between embodiment two and embodiment one are described. The differences are that the first threaded hole 214 penetrating the support portion 22 in the up-down direction is disposed inside the support portion 22, and the adjustment screw 23 is threadedly connected to the first threaded hole 214 and has an end portion abutting onto the adjustment portion 21. The first threaded hole 214 is disposed inside the support portion 22 so that the distance between the adjustment portion 21 and the support portion 22 can also be changed, thereby tightening the connection between the connector 3 and the adjustment portion 21.

Embodiment Three

Figure 7:
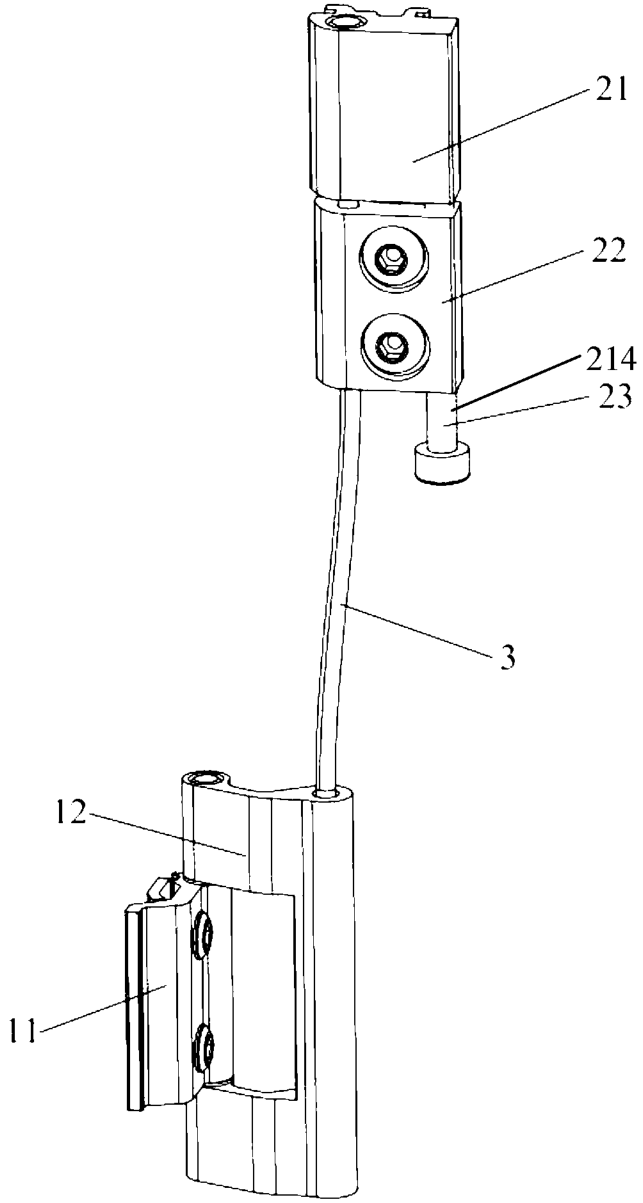
FIG. 7 is a view illustrating the structure of a load-bearing accessory according to embodiment two of the present application.
Figure 8:
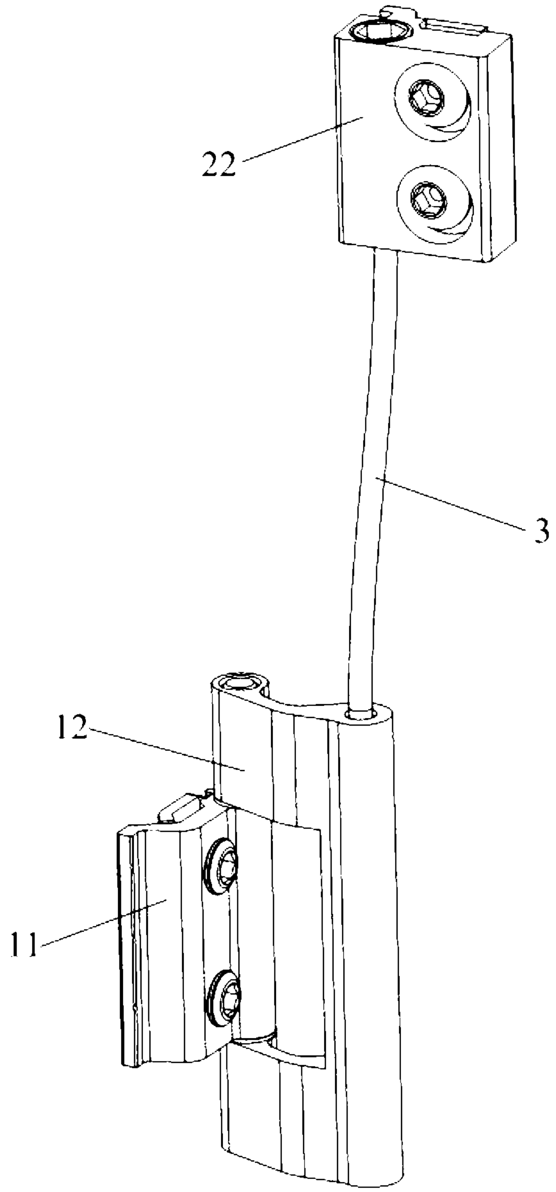
FIG. 8 is a view illustrating the structure of a load-bearing accessory according to embodiment three of the present application.
Figure 9:
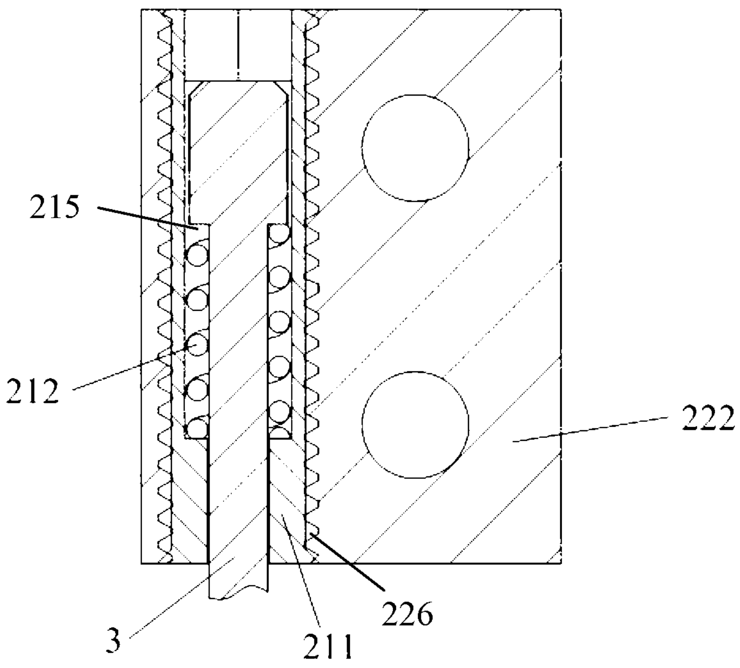
FIG. 9 is a section view illustrating the partial structure of a load-bearing accessory according to embodiment three of the present application.

FIGS. 7 to 9 show embodiment three in which the same or corresponding parts as in embodiment one use reference numerals corresponding to embodiment one. For simplicity, only differences between embodiment three and embodiment one are described. The differences are that a second threaded hole 226 is disposed inside the support portion 22, a periphery of the adjustment portion 21 is provided with an external thread 216, and the adjustment portion 21 is threadedly connected to the second threaded hole 226. The external thread 216 is disposed on the adjustment block 211, and the adjustment block 211 can move away from the support portion 22 when the adjustment block 211 is rotated. The end portion of the connector 3 compresses the spring 212 to tighten the connection between the connector 3 and the adjustment portion 21.

One end of the adjustment block 211 facing away from the hinge 1 is provided with an adjustment groove 213. The adjustment groove 213 communicates with the stepped hole 215. The adjustment block 211 is rotated through a screwdriver adapted to the shape and size of the adjustment groove 213. In this embodiment, the adjustment groove 213 is in a hexagon shape. Optionally, the adjustment groove 213 may be in other shapes such as a minus, a cross and a square, as long as the lower part of the adjustment groove 213 is ensured to have an entity to support the screwdriver to perform the adjustment.

Embodiment Four

Figure 10:
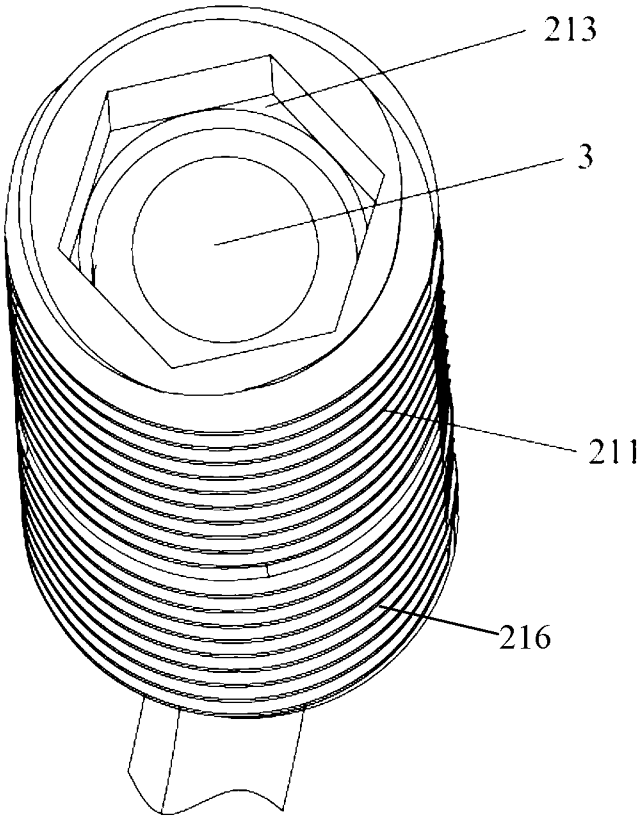
FIG. 10 is a view illustrating the partial structure of a load-bearing accessory according to embodiment three of the present application.
Figure 11:
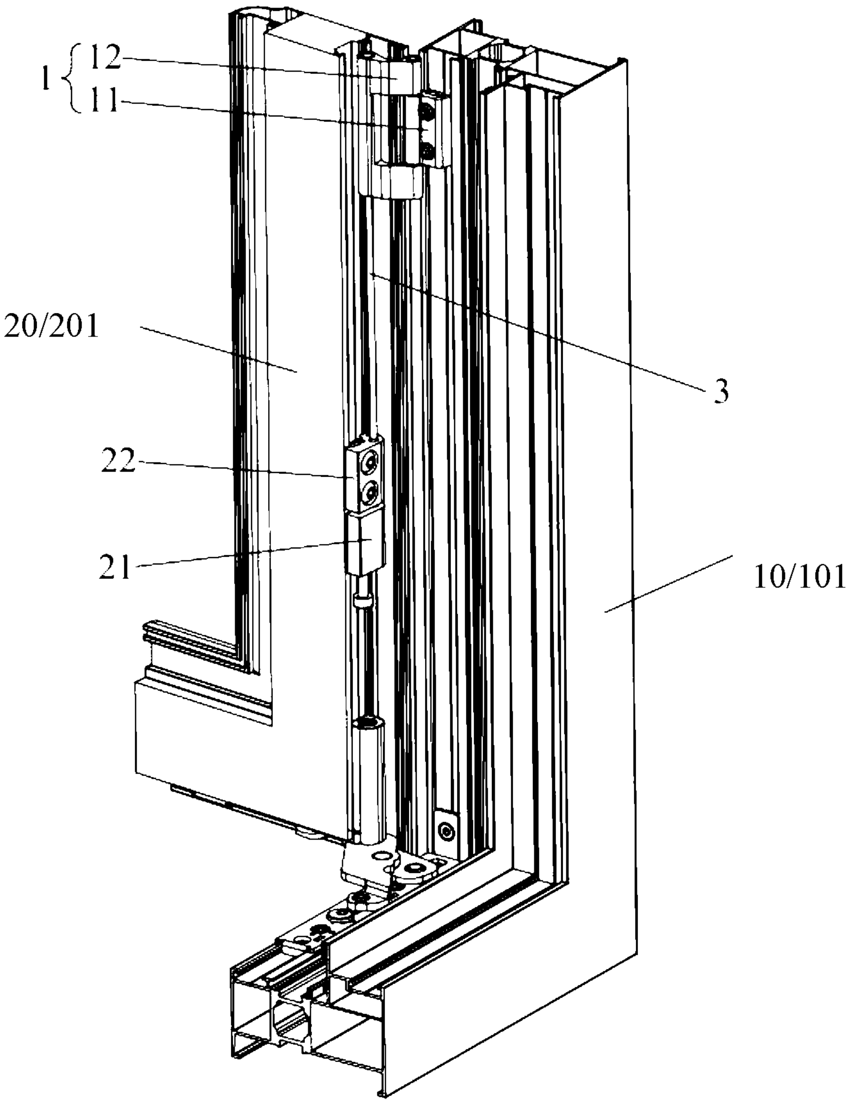
FIG. 11 is a view illustrating the structure of a load-bearing accessory according to embodiment four of the present application.

FIG. 10 shows embodiment four in which the same or corresponding parts as in embodiment one use reference numerals corresponding to embodiment one. For simplicity, only differences between embodiment four and embodiment one are described. The differences are that the hinge 1 is located above the frame 2 and is connected to the first component 10, and the frame 2 is connected to the second component 20. The first lock tab 111 is fixedly connected to the first component 10, and the second lock tab 221 is fixedly connected to the second component 20, that is, the hinge 1 is connected to the fixed window frame 101, and the frame 2 is connected to the movable window sash 201. As long as rotation is ensured between the first fixed block 112 and the connecting block 121 of the hinge 1 when the movable window sash 201 is opened, the position of the connecting block 121 can remain unchanged, the connecting block 121 can prevent the sealing strip on the movable window sash 201 from being worn by the connector 3 during the opening and closing of the movable window sash 201, and the hinge 1 can protect the sealing strip on the movable window sash 201.

The present application provides the load-bearing accessory. The one of the hinge or the frame that is located at the upper position of the load-bearing accessory supports the connector so that the connector can support the other one of the hinge or the frame that is located at the lower position of the load-bearing accessory, and so that the one of the hinge or the frame that is located at the upper position of the load-bearing accessory can bear the force of the other one of the hinge or the frame that is located at the lower position of the load-bearing accessory. Consequentially, the structure can be simple, and the cost can be low. The distance between the adjustment portion and the support portion is adjustable so as to adjust two ends of the connector to suitable positions for support. The distance between the hinge and the frame is changeable, that is, the support can also be maintained even when the distance between the hinge and the frame becomes longer.

What is claimed is:

1. A load-bearing accessory, comprising:

a hinge, wherein the hinge comprises a fixed portion and a connecting portion, the connecting portion comprises a connecting block that is rotatably connected to a fixed shaft;

a frame comprising an adjustment portion and a support portion, wherein a distance between the adjustment portion and the support portion is adjustable;

wherein the fixed portion is connected to a first component, and the frame is connected to a second component; or the fixed portion is connected to the second component, and the frame is connected to the first component; and a connector, wherein a first end of the connector is connected to the connecting block, and a second end of the connector is connected to the adjustment portion; and one of the hinge or the frame that is located at an upper position of the load-bearing accessory is configured to support the connector, and the connector is configured to support another one of the hinge or the frame that is located at a lower position of the load-bearing accessory;

wherein the connecting block is provided with a placement groove, and first connecting holes along a up-down direction, upper and lower sides of the placement groove are each provided with at least one first connecting hole, the fixed portion is provided with one second connecting hole along the up-down direction, the fixed shaft sequentially passes through one of the at least one first connecting hole on the upper side of the placement groove, the one second connecting hole, and one of the at least one first connecting hole on the lower side of the placement groove, the placement groove is able to accommodate the fixed portion, the connecting block is provided with a mounting hole penetrating the connecting block in the up-down direction, and the connector is connected to an inside of the mounting hole.

2. The load-bearing accessory according to claim 1, wherein the frame comprises an adjustment screw, a first threaded hole penetrating one of the adjustment portion or the support portion in the up-down direction is disposed inside the one of the adjustment portion or the support portion, the adjustment screw is threadedly connected to the first threaded hole and has an end portion abutting onto another one of the adjustment portion or the support portion, a first through hole is disposed inside the support portion, and the connector passes through the first through hole.

3. The load-bearing accessory according to claim 1, wherein a second threaded hole is disposed inside the support portion, a periphery of the adjustment portion is provided with an external thread, and the adjustment portion is threadedly connected to the second threaded hole.

4. The load-bearing accessory according to claim 2, wherein the adjustment portion comprises an adjustment block and a spring, a stepped hole penetrating the adjustment block in the up-down direction is disposed inside the adjustment block, one end of the connector is located inside the stepped hole, the stepped hole comprises a large diameter segment and a small diameter segment, the spring is located inside the large diameter segment, has a first end abutting onto a solid end surface of the small diameter segment in a peripheral direction of the small diameter segment, and is sleeved outside the connector, and an end portion of the connector abuts onto a second end of the spring.

5. The load-bearing accessory according to claim 1, wherein the fixed portion comprises a first lock tab, a first fixed block and a first screw, the first lock tab engages with one of the first component or the second component, the first fixed block is provided with a second through hole, and the first screw passes through the second through hole and is threadedly connected to the first lock tab.

6. The load-bearing accessory according to claim 1, wherein the fixed portion comprises a first fixed block and a first connecting screw, the first fixed block is provided with a first connecting through hole, and the first connecting screw passes through the first connecting through hole and is threadedly connected to one of the first component or the second component.

7. The load-bearing accessory according to claim 5, wherein the support portion comprises a second lock tab, a second fixed block and a second screw, the second lock tab engages with another one of the first component or the second component, the second fixed block is provided with a third through hole, and the second screw passes through the third through hole and is threadedly connected to the second lock tab.

8. The load-bearing accessory according to claim 5, wherein the support portion comprises a second fixed block and a second connecting screw, the second fixed block is provided with a second connecting through hole, and the second connecting screw passes through the second connecting through hole and is threadedly connected to another one of the first component or the second component.

9. The load-bearing accessory according to claim 1, wherein the connector is a flexible member.

10. A window, comprising a fixed window frame, a movable window sash, and the load-bearing accessory according to claim 1, wherein one of the hinge or the frame that is located at the upper position of the load-bearing accessory is connected to the fixed window frame, and another one of the hinge or the frame that is located at the lower position of the load-bearing accessory is connected to the movable window sash.

11. The load-bearing accessory according to claim 3, wherein the adjustment portion comprises an adjustment block and a spring, a stepped hole penetrating the adjustment block in the up-down direction is disposed inside the adjustment block, one end of the connector is located inside the stepped hole, the stepped hole comprises a large diameter segment and a small diameter segment, the spring is located inside the large diameter segment, has a first end abutting onto a solid end surface of the small diameter segment in a peripheral direction of the small diameter segment, and is sleeved outside the connector, and an end portion of the connector abuts onto a second end of the spring.

12. The load-bearing accessory according to claim 6, wherein the support portion comprises a second lock tab, a second fixed block and a second screw, the second lock tab engages with another one of the first component or the second component, the second fixed block is provided with a third through hole, and the second screw passes through the third through hole and is threadedly connected to the second lock tab.

13. The load-bearing accessory according to claim 6, wherein the support portion comprises a second fixed block and a second connecting screw, the second fixed block is provided with a second connecting through hole, and the second connecting screw passes through the second connecting through hole and is threadedly connected to another one of the first component or the second component.

14. The window according to claim 10, wherein the frame comprises an adjustment screw, a first threaded hole penetrating one of the adjustment portion or the support portion in the up-down direction is disposed inside the one of the adjustment portion or the support portion, the adjustment screw is threadedly connected to the first threaded hole and has an end portion abutting onto another one of the adjustment portion or the support portion, a first through hole is disposed inside the support portion, and the connector passes through the first through hole.

15. The window according to claim 10, wherein a second threaded hole is disposed inside the support portion, a periphery of the adjustment portion is provided with an external thread, and the adjustment portion is threadedly connected to the second threaded hole.

16. The window according to claim 14, wherein the adjustment portion comprises an adjustment block and a spring, a stepped hole penetrating the adjustment block in the up-down direction is disposed inside the adjustment block, one end of the connector is located inside the stepped hole, the stepped hole comprises a large diameter segment and a small diameter segment, the spring is located inside the large diameter segment, has a first end abutting onto a solid end surface of the small diameter segment in a peripheral direction of the small diameter segment, and is sleeved outside the connector, and an end portion of the connector abuts onto a second end of the spring.

* * * * *